Oct. 16, 1962 B. G. CRAMER 3,059,128
BISTABLE MULTIVIBRATOR WITH HALF GATE
Filed July 12, 1960
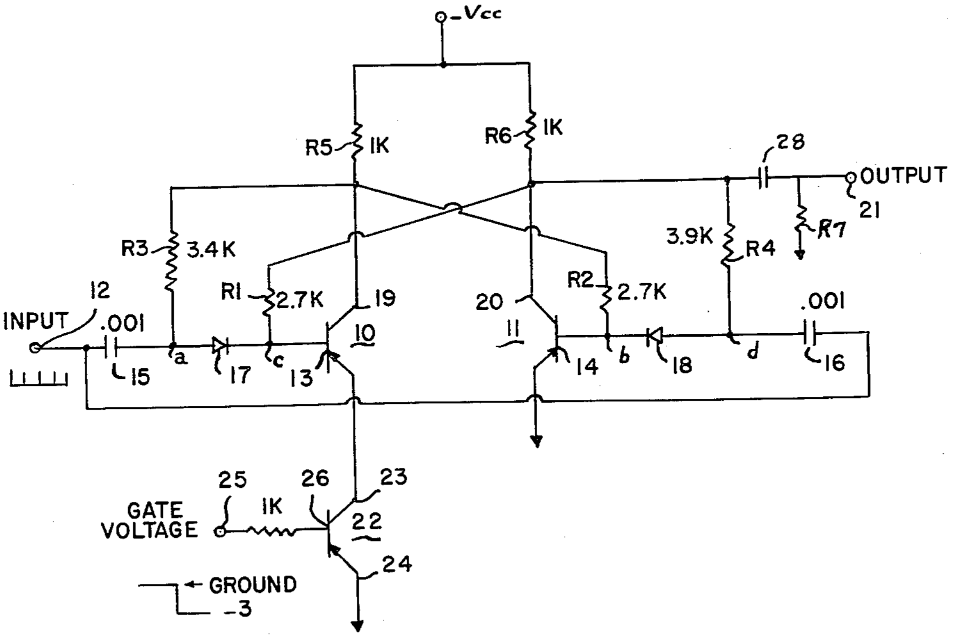
INVENTOR.
BRUCE G. CRAMER
BY Wade Koontz
ATTORNEY
Richard J. Killoren
AGENT

United States Patent Office 3,059,128
Patented Oct. 16, 1962

3,059,128

BISTABLE MULTIVIBRATOR WITH HALF GATE

Bruce G. Cramer, Philadelphia, Pa., assignor to the United States of America as represented by the Secretary of the Air Force Filed July 12, 1960, Ser. No. 42,450
2 Claims. (Cl. 307—88.5)

This invention relates to a bistable transistor multivibrator circuit which uses a gate to selectively block conduction in one of the transistors of the multivibrator.

One object of the invention is to provide a circuit capable of alternately providing an output pulse for every input pulse or for every second input pulse.

This and other objects will be more clearly understood from the following description taken with the drawing, wherein;

The single FIGURE shows a bistable multivibrator with a half gate according to the invention.

Referring more particularly to the drawing, reference numbers 10 and 11 refer to the transistors of a bistable multivibrator. An input pulse signal at 12 is applied to the base electrodes 13 and 14 through coupling condensers 15 and 16 and steering diodes 17 and 18. The resistors $R_1$, $R_2$ couple the collectors 19 and 20 to the base electrodes 14 and 13, respectively, to provide for the multivibrator action. Resistors $R_3$ and $R_4$ provide the biases for the steering diodes 17 and 18. As can be seen when 10 is conducting and 11 is off, points *a* and *b* will be at ground potential or slightly negative with respect to ground as determined by the drop across $R_5$ and conduction of diode 17 and points *c* and *d* will be at negative potential $-V_{cc}$. Diode 17 is then biased in the forward direction and diode 18 is biased in the reverse direction so that the next positive pulse can be applied only to base 13. This positive pulse cuts off 10 and causes 11 to start conducting. When 11 is conducting and 10 is off, the biases on diodes 17 and 18 are reversed so that the signal can be applied only to base 14.

The collectors 19 and 20 are connected through collector load resistors $R_5$ and $R_6$ to a negative supply $-V_{cc}$ for PNP type of transistors. The collector supply would be positive if NPN type transistors were used at 10 and 11. A capacitor 28 and a resistor $R_7$ form a differentiating circuit which acts to produce negative and positive pulses from the leading edges of the squared wave form produced by the bistable multivibrator. The positive pulses which appear at 21 are usually of little consequence since most pulse circuits which would follow this circuit would be sensitive to pulses of only one polarity. However, if these positive pulses were annoying they could be removed by a clamping diode. Thus the circuit described is a bistable multivibrator which produces a negative output pulse at 21 for every second input pulse.

A third PNP transistor 22 is connected in the emitter circuit of transistor 10, with the collector 23 being directly connected to the emitter of 10 and the emitter 24 of transistor 22 being connected to ground. A signal applied at 25 is applied to base electrode 26 and determines whether or not transistor 22 can conduct. When the base of 22 is held at a slightly negative potential, transistor 22 can conduct so that the emitter of transistor 10 is effectively held at ground potential and the circuit of transistors 10 and 11 acts as a normal bistable multivibrator producing a negative output pulse at 21 for every second input pulse at 12.

When the base of transistor 22 is held at ground potential, neither transistor 22 nor transistor 10 can conduct so that transistor 11 is always held conducting by the negative potential applied to base 14 from collector 19 except when a positive pulse is applied at the input 12. Thus, when transistor 22 is held nonconducting, there will be a negative output pulse at 21 for every input pulse at 12. These pulses pass through the differentiating circuit relatively unchanged.

There is thus provided a circuit capable of alternately providing an output pulse for every input pulse or for every second input pulse in which the use of two gates plus one inverter is unnecessary.

While one specific embodiment has been described in some detail, it is obvious that numerous changes can be made without departing from the general principles and scope of the invention.

I claim:

1. A pulse switching circuit, comprising a bistable multivibrator having a first and second transistor, means for applying a pulse signal to the base electrodes of said transistors, a steering diode connected between said signal applying means and each of said base electrodes to thereby apply said signal to only one of said transistors, an output circuit connected in the collector circuit of said first transistor, a third transistor connected in the emitter circuit of said second transistor and having its emitter-collector circuit connected in series with the emitter-collector circuit of said second transistor, means for connecting the collector of said third transistor to the emitter of said second transistor, means for connecting the emitters of said first and said third transistors to the same potential supply, means for applying a gate signal to the base electrode of said third transistor to selectively block conduction in said second and said third transistors.

2. A pulse switching circuit, comprising a bistable multivibrator having a first and second PNP type transistor having their collectors connected to a negative potential source and their emitters connected at ground potential, means for applying a positive pulse signal to the base electrodes of said transistors, a steering diode connected between said signal applying means and each of said base electrodes to thereby apply said signal to only one of said transistors, an output circuit connected in the collector circuit of said first transistor, a differentiating circuit in said output circuit, a third transistor, the emitter of said second transistor being connected to ground by way of the emitter-collector circuit of said third transistor, and means for selectively applying a blocking signal to the base electrode of said third transistor to thereby block conduction in said second and said third transistors.

References Cited in the file of this patent

UNITED STATES PATENTS

| | | |
|---|---|---|
| 2,909,675 | Edson | Oct. 20, 1959 |
| 2,927,733 | Campbell | Mar. 8, 1960 |
| 2,986,649 | Wray | May 30, 1961 |